US010356133B2

(12) United States Patent
Sylvain

(10) Patent No.: US 10,356,133 B2
(45) Date of Patent: *Jul. 16, 2019

(54) AUTOMATIC CALL INITIATION IN RESPONSE TO SELECTING TAGS IN ELECTRONIC DOCUMENTS AND APPLICATIONS

(71) Applicant: Apple Inc., Cupertino, CA (US)

(72) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,552

(22) Filed: Sep. 11, 2017

(65) Prior Publication Data

US 2018/0069904 A1 Mar. 8, 2018

Related U.S. Application Data

(63) Continuation of application No. 11/316,431, filed on Dec. 22, 2005, now Pat. No. 9,762,623.

(51) Int. Cl.

| H04L 29/06 | (2006.01) |
|---|---|
| H04M 1/247 | (2006.01) |
| H04M 1/253 | (2006.01) |
| H04M 7/00 | (2006.01) |
| H04M 3/42 | (2006.01) |

(52) U.S. Cl.
CPC ........ *H04L 65/1069* (2013.01); *H04L 65/103* (2013.01); *H04M 1/247* (2013.01); *H04M 1/2535* (2013.01); *H04M 7/003* (2013.01); *H04M 3/42* (2013.01); *H04M 2201/42* (2013.01); *H04M 2203/2016* (2013.01)

(58) Field of Classification Search
CPC .. H04L 65/1069; H04L 65/103; H04M 1/247; H04M 1/2535; H04M 7/003; H04M 2201/42; H04M 2203/2016; H04M 3/42
See application file for complete search history.

(56) References Cited

U.S. PATENT DOCUMENTS

| 5,241,589 | A | * | 8/1993 | Jefferson | ................. | H04M 1/02 |
| | | | | | | 379/355.01 |
| 5,459,775 | A | * | 10/1995 | Isono | ...................... | H04M 3/42 |
| | | | | | | 348/E7.079 |
| 5,627,978 | A | * | 5/1997 | Altom | ................... | G06F 3/0481 |
| | | | | | | 715/758 |

(Continued)

*Primary Examiner* — Wutchung Chu
(74) *Attorney, Agent, or Firm* — Meyertons Hood Kivlin Kowert and Goetzel PC

(57) ABSTRACT

The present invention provides a telecom control function in a communication terminal. The telecom control function is configured to receive call indicia when a call tag in a software entity, such as an application or electronic document, is selected by a user of the communication terminal. The call indicia provides information associated with a remote party with which a call is being requested by the user. The telecom control function may use the call indicia along with user indicia obtained from the user and indirectly establish a call with the remote party using a telephony terminal other than the communication terminal. If the communication terminal includes a telecommunication client capable of supporting a call, the telecom control function may instruct the telecommunication client to directly initiate the call with the remote party using the call indicia.

20 Claims, 10 Drawing Sheets

(56) References Cited

U.S. PATENT DOCUMENTS

| | | | |
|---|---|---|---|
| 6,262,735 B1 * | 7/2001 | Etelapera | G06F 3/0489 715/854 |
| 6,310,944 B1 * | 10/2001 | Brisebois | H04M 3/42042 379/142.01 |
| 6,356,533 B1 * | 3/2002 | Bruno | H04L 12/12 370/252 |
| 6,507,590 B1 * | 1/2003 | Terho | H04W 28/06 370/466 |
| 6,577,622 B1 * | 6/2003 | Schuster | H04M 3/56 370/352 |
| 6,882,640 B1 * | 4/2005 | Berger | H04L 12/5692 370/353 |
| 7,002,950 B1 * | 2/2006 | Smith | H04Q 3/0045 370/241 |
| 7,123,700 B1 * | 10/2006 | Weaver, III | H04L 29/06027 379/88.19 |
| 7,245,941 B2 * | 7/2007 | Scott | H04M 1/663 379/204.01 |
| 7,266,185 B2 * | 9/2007 | Trandal | H04M 3/42195 379/142.01 |
| 7,356,567 B2 * | 4/2008 | Odell | G06Q 10/107 709/206 |
| 7,440,556 B2 * | 10/2008 | Bear | H04N 7/142 348/E7.079 |
| 7,512,226 B1 * | 3/2009 | Yoakum | H04M 1/2535 370/352 |
| 7,546,143 B2 * | 6/2009 | Nelson | H04L 12/66 379/142.14 |
| 7,599,477 B2 * | 10/2009 | Le Pabic | H04M 1/2535 379/93.01 |
| 7,603,408 B1 * | 10/2009 | McGinnis | H03M 7/30 709/203 |
| 7,623,643 B2 * | 11/2009 | Raghav | H04M 1/575 379/201.01 |
| 7,746,990 B1 * | 6/2010 | Fabbrizio | H04M 7/003 379/114.13 |
| 7,907,122 B2 * | 3/2011 | LaPointe | G06F 3/0237 345/156 |
| 8,170,202 B2 * | 5/2012 | Lankes | H04M 1/2472 379/142.01 |
| 8,346,231 B1 * | 1/2013 | Smith | H04L 12/1818 379/202.01 |
| 8,411,833 B2 * | 4/2013 | Dolan | H04M 3/42195 379/201.01 |
| 8,432,897 B2 * | 4/2013 | Bangor | H04L 29/06027 370/352 |
| 8,488,761 B2 * | 7/2013 | Reding | H04M 3/2218 379/142.01 |
| 8,588,382 B2 * | 11/2013 | Paden | H04M 3/2218 379/112.06 |
| 9,092,177 B2 * | 7/2015 | Chang | H04L 12/2805 |
| 2002/0046279 A1 * | 4/2002 | Chung | G06Q 20/00 709/227 |
| 2002/0187777 A1 * | 12/2002 | Osterhout | H04M 3/54 455/417 |
| 2003/0118182 A1 * | 6/2003 | Elomaa | G06F 21/10 380/203 |
| 2003/0215064 A1 * | 11/2003 | Yau | G06Q 30/016 379/67.1 |
| 2004/0165714 A1 * | 8/2004 | Pinault | H04L 67/12 379/245 |
| 2004/0208303 A1 * | 10/2004 | Rajagopalan | H04M 3/54 379/202.01 |
| 2004/0240650 A1 * | 12/2004 | Bear | H04M 1/575 379/142.01 |
| 2005/0091272 A1 * | 4/2005 | Smith | G06Q 10/06 |
| 2005/0201362 A1 * | 9/2005 | Klein | H04M 3/42161 370/352 |
| 2006/0020708 A1 * | 1/2006 | Hsieh | H04L 51/04 709/230 |
| 2006/0126806 A1 * | 6/2006 | Trandal | H04M 1/663 379/88.26 |
| 2006/0142012 A1 * | 6/2006 | Kirchhoff | H04M 3/42357 455/445 |
| 2006/0227957 A1 * | 10/2006 | Dolan | H04M 3/436 379/212.01 |
| 2006/0285674 A1 * | 12/2006 | Le Creff | H04L 29/06027 379/211.01 |
| 2007/0061468 A1 * | 3/2007 | Kelly | G06Q 10/10 709/227 |
| 2007/0116224 A1 * | 5/2007 | Burke | H04L 29/06027 379/201.12 |
| 2007/0168537 A1 * | 7/2007 | Misra | H04L 29/06027 709/230 |
| 2007/0189267 A1 * | 8/2007 | Metcalf | H04M 3/42195 370/352 |
| 2008/0037741 A1 * | 2/2008 | Bear | H04M 1/575 379/142.01 |
| 2008/0139116 A1 * | 6/2008 | Balgard | G08C 17/02 455/41.2 |
| 2009/0192917 A1 * | 7/2009 | Wolkin | G06Q 10/02 705/26.1 |
| 2013/0103775 A1 * | 4/2013 | Chang | H04L 12/2805 709/206 |

\* cited by examiner

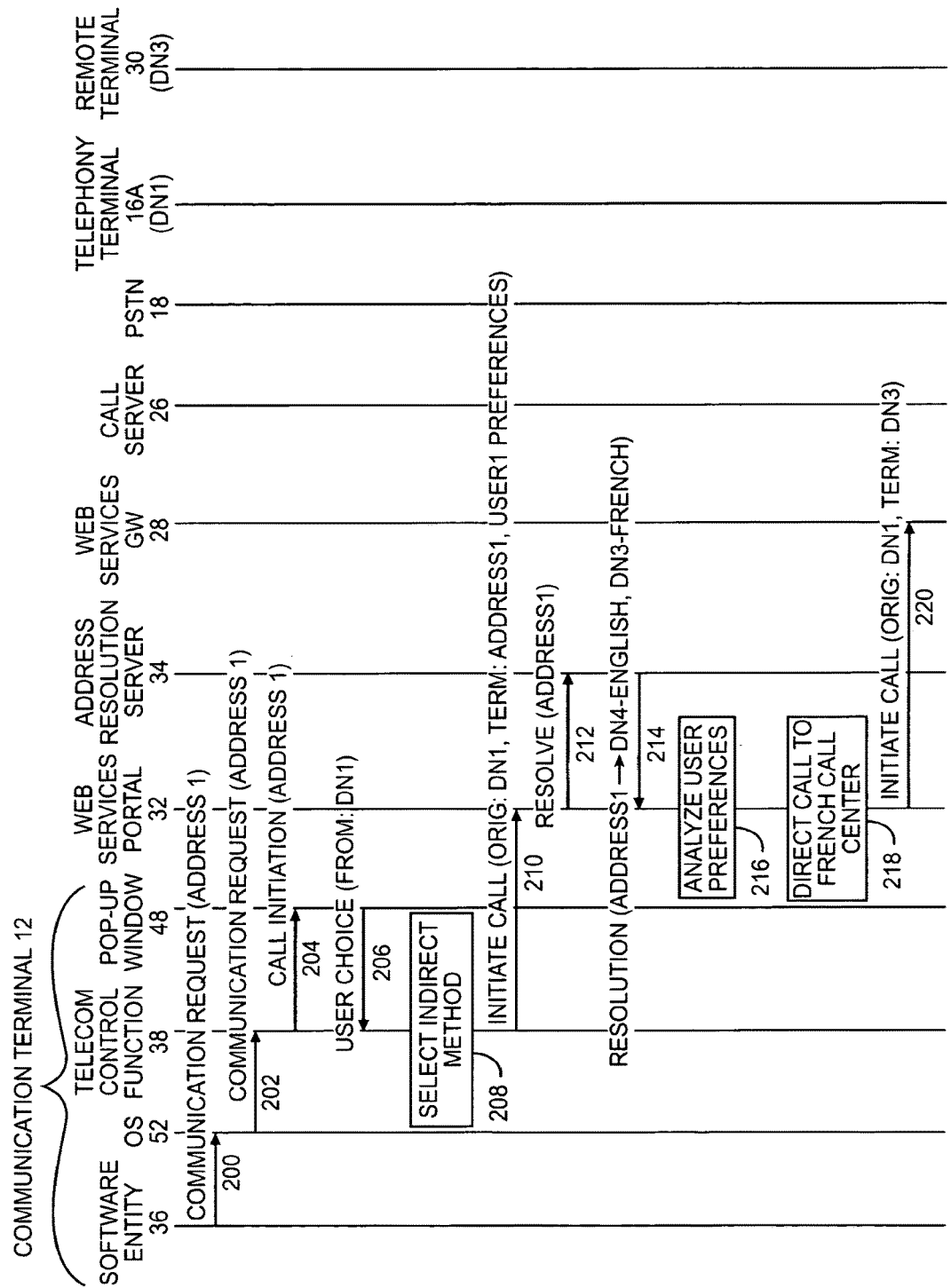

AUTOMATIC CALL INITIATION IN RESPONSE TO SELECTING TAGS IN ELECTRONIC DOCUMENTS AND APPLICATIONS

CROSS-REFERENCE TO RELATED APPLICATIONS

This invention is a continuation application of U.S. patent application Ser. No. 11/316,431, entitled "Automatic Call Initiation in Response to Selecting Tags in Electronic Documents and Applications", filed Dec. 22, 2005, whose disclosure is incorporated herein by reference.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present invention relates to telecommunication, and in particular to initiating telephony calls in response to a click-to-call selection in electronic media or an electronic application.

BACKGROUND OF THE INVENTION

As the Internet and associated web services evolve, there is a movement to associate telephony calls with certain web applications. In click-to-call scenarios, an icon to initiate a telephony call may be provided in a web page, which is supported by a web client, such as a web browser. Upon selecting the icon, the web client may initiate the telephony call to a destination associated with the icon, wherein a voice session is automatically established. The ability to initiate telephony calls by simply clicking on an icon in a web page provides significant value to users and content providers.

Unfortunately, the telephony call must be originated by the web client, which is provided by a communication terminal. In many instances, the communication terminal is not equipped to support telephony calls, since many of the communication terminals are personal computers or personal digital assistants without the hardware and software necessary to support telephony calls. Even if the communication terminal is capable of supporting telephony calls via the web client, the user may wish to use another telephony terminal, such as a mobile, home, or work telephone for a telephony call to the destination associated with the icon. If another telephony terminal is desired, the user is not able to take advantage of the icon to automatically initiate the call and must take separate measures to initiate the telephony call.

Select communication terminals may support a web client as well as provide a telecommunication client for supporting telephony calls over virtually any type of network. Although the telecommunication client can support telephony calls, the web client is not able to engage the telecommunication client to initiate calls in response to selecting the icon in a click-to-call event. In essence, the telecommunication client is isolated from the web client. As such, any telephony calls initiated from the web client must be supported by the web client, not the telecommunication client.

Click-to-call capability is also applicable for email, instant messaging, word processing, and spreadsheet applications. Icons for initiating a telephony call may be provided in any electronic document, such as emails, instant messages, word processing documents, or spreadsheets, as well as in the application interfaces. However, the inability to support telephony calls or to use a terminal other than the one running the corresponding application for the telephony call remains an issue. Accordingly, there is need for an efficient and effective technique to automatically initiate telephony calls upon making selections in electronic documents or applications. There is a further need to initiate telephony calls to be established between two remote telephony terminals as needed or desired. There is yet a further need to allow a user to control the click-to-call event.

SUMMARY OF THE INVENTION

The present invention provides a telecom control function in a communication terminal. The telecom control function is configured to receive call indicia when a call tag in a software entity, such as an application or electronic document, is selected by a user of the communication terminal. The call indicia provides information associated with a remote party with which a call is being requested by the user. The telecom control function may use the call indicia along with user indicia obtained from the user and indirectly establish a call with the remote party using a telephony terminal other than the communication terminal. If the communication terminal includes a telecommunication client capable of supporting a call, the telecom control function may instruct the telecommunication client to directly initiate the call with the remote party using the call indicia. Based on user indicia or predetermined criteria, the telecom control function may select between an indirect or direct initiation of the call in a dynamic fashion, and then effect initiation of the call, either directly or indirectly. Indirect call initiation generally entails the telecom control function instructing a web services portal to take the requisite steps to initiate a call between the remote party and another telephony terminal.

When the call tag is selected and the associated call indicia is received, the telecom control function may provide an alert to the user in the form of a pop-up window or other mechanism, which allows the user to make various selections or provide user indicia to the telecom control function. The user indicia may be used to assist in determining whether to use an indirect or direct call initiation, identify information necessary to establish a call with the associated telephony terminal when indirect call initiation is used, or provide various preferences to employ in association with the call. When preferences are employed that cannot be implemented by the telecom control function, the preferences may be provided to the web services portal during an indirect call initiation attempt, where the preferences may be implemented.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 7A and 7B illustrate a communication flow for an indirect call initiation technique according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

On a communication terminal, the present invention provides a telecommunication control function to control call initiation in response to a user selecting a call tag in an electronic document or applications. Instead of simply attempting to initiate the call from the communication terminal via the application supporting the electronic document or having the call tag, the telecommunication control function will recognize selection of the call tag and initiate the call in a determined fashion. In one embodiment, the telecommunication control function will indirectly establish the call by instructing a web services portal to establish the call between a remote entity and a telephony terminal other than the communication terminal. In another embodiment, the telecommunication control function will instruct a telecommunication client on the communications terminal to establish the call directly with the remote entity. Further, the telecommunication control function may provide an interface with the user to allow the user to dynamically control call initiation. For example, the user may be able to select an associated terminal to use for the call or control whether the call is established with an associated telephony terminal or via the communication terminal, if such capability is supported by the communication terminal. Other user or predefined criteria may be used by the telecommunication control function to control initiation of the call. Prior to delving into the details of the present invention, an overview of a compatible communication environment is provided.

Figure 1:
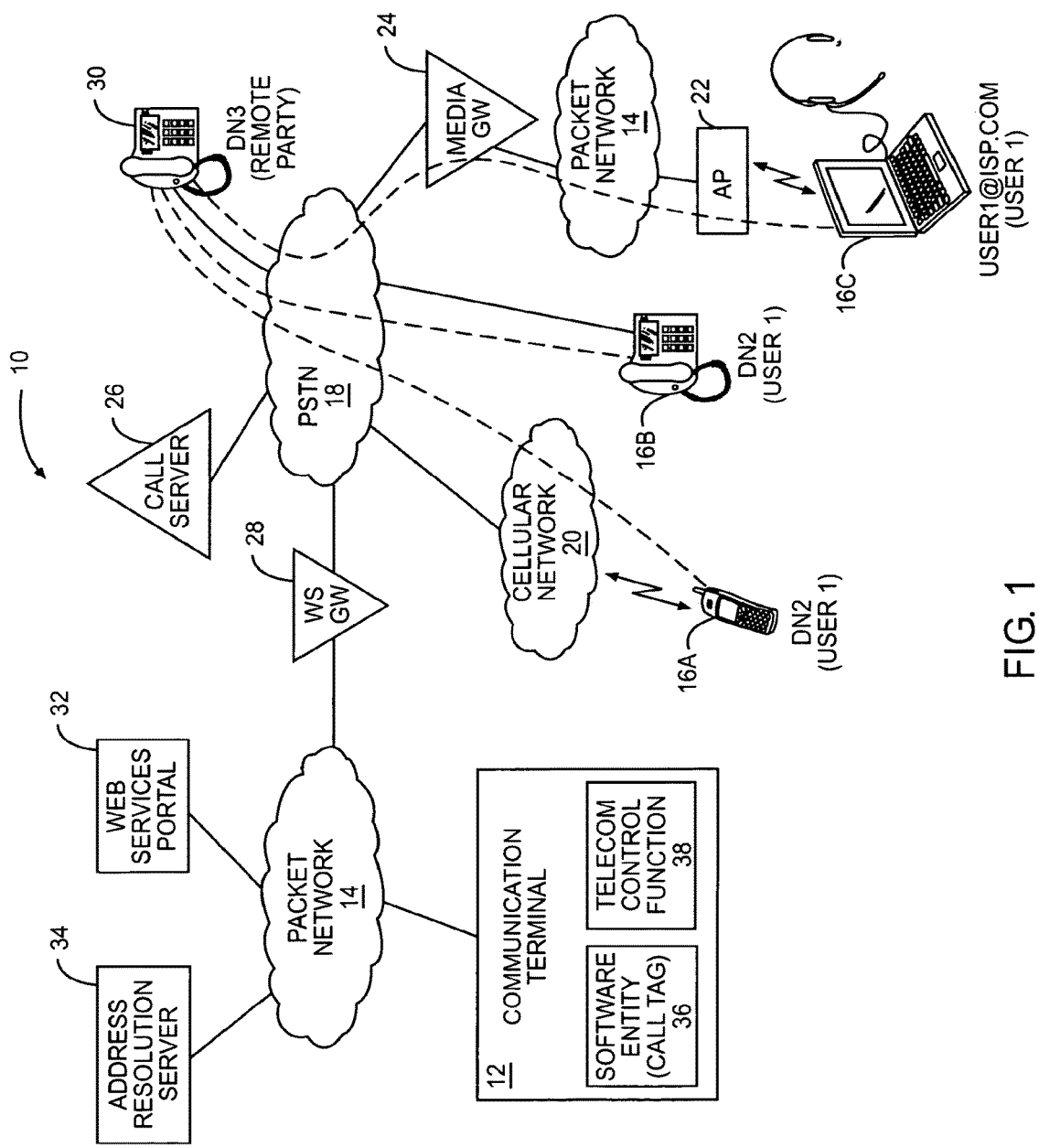
FIG. 1 is a block representation of a communication environment according to one embodiment of the present invention.

With reference to FIG. 1, a communication environment 10 is illustrated as including a communication terminal 12, which is capable of communicating with a packet network 14 to facilitate various types of services ranging from email and instant messaging services to web browsing and telecommunication services. The communication terminal 12 is associated with a user, who may have various other telephony terminals 16A, 16B, and 16C through which telephony communications are available and perhaps desired. The telephony terminals 16A, 16B, and 16C may be directly or indirectly supported by a public switched telephone network (PSTN) 18. As shown, telephony terminal 16A is a cellular telephone supported by a cellular network 20, which is coupled to the PSTN 18. Telephony terminal 16B is a traditional PSTN telephone that may connect directly to the PSTN 18.

Telephony terminal 16C is represented as a personal computer having telephony capabilities entailing at least a speaker and headphones, which are represented as the illustrated headset, and the requisite hardware and software to facilitate telephony communications. In particular, the telephony terminal 16C supports packet-based telephony communications and connects to the packet network 14 through an access point 22. The access point 22 may provide a wired or wireless interface with the telephony terminal 16C. Further, the packet network 14 may be coupled to the PSTN 18 through an appropriate media gateway (GW) 24, which will facilitate the requisite convergence between packet based and circuit-switched telephony content.

Call control may be provided by a call server 26, which is capable of controlling the initiation and establishment of calls associated with the PSTN 18, and perhaps the packet network 14. When calls are supported over the packet network 14 and the PSTN 18, call control signaling spanning the packet network 14 and the PSTN 18 is routed through an appropriate web services gateway (WS GW) 28. For the present invention, the web services gateway 28 will be able to receive an instruction via the packet network 14 to initiate a call through the PSTN 18 or supported networks. Such call initiation may require interaction with the call server 26 and the media gateway 24, as those skilled in the art will recognize. For illustration purposes, a remote terminal 30 is used to illustrate establishment of calls to a remote party for the user. As shown in FIG. 1, calls may be established with the remote terminal 30 from either telephony terminal 16A, 16B, or 16C. The dashed lines illustrate the telephony connections between the various telephony terminals 16A, 16B, and 16C and remote terminal 30.

Also illustrated in FIG. 1 are a web services portal 32 and an address resolution server 34, which may be employed to assist in providing the requisite instructions to the web services gateway 28 to initiate telephony calls between any one of the telephony terminals 16A, 16B, and 16C and the remote terminal 30. In operation, a software entity 36, which may represent an electronic document or an application having a call tag associated with call indicia, is provided in the communication terminal 12. When the call tag is selected by the user, the call indicia associated with the call tag is provided to a telecommunication (telecom) control function 38, which will control initiation of the telephony call for the communication terminal 12. The call tag may be an icon, string, link, or any other element that is selectable by the user and associated with call indicia for establishing a call with the remote party. The call indicia may be a directory number or telephony address associated with the remote terminal 30. The telecom control function 38 may obtain user indicia from the user to assist in determining how or where the call should be initiated. Based on the call indicia and any available user indicia, the telecom control function 38 will then take the necessary steps to initiate the telephony call.

In the embodiment illustrated in FIG. 1, the communication terminal 12 will send a message to the web services portal 32 to establish a call between one of the telephony terminals 16A, 16B, or 16C and the remote terminal 30. The web services portal 32 may analyze the call indicia and any available user indicia and then take the requisite steps to initiate the call on behalf of the communication terminal 12. Depending on the call indicia provided by the communication terminal 12, the address resolution server 34 may be employed to determine an appropriate directory number, telephony address, or format thereof based on that provided in the call indicia. The web services portal 32 will then provide the requisite instructions to the web services gateway 28, which will respond by establishing the telephony call between the selected telephony terminal 16A, 16B, or 16C and the remote terminal 30.

Figure 2:
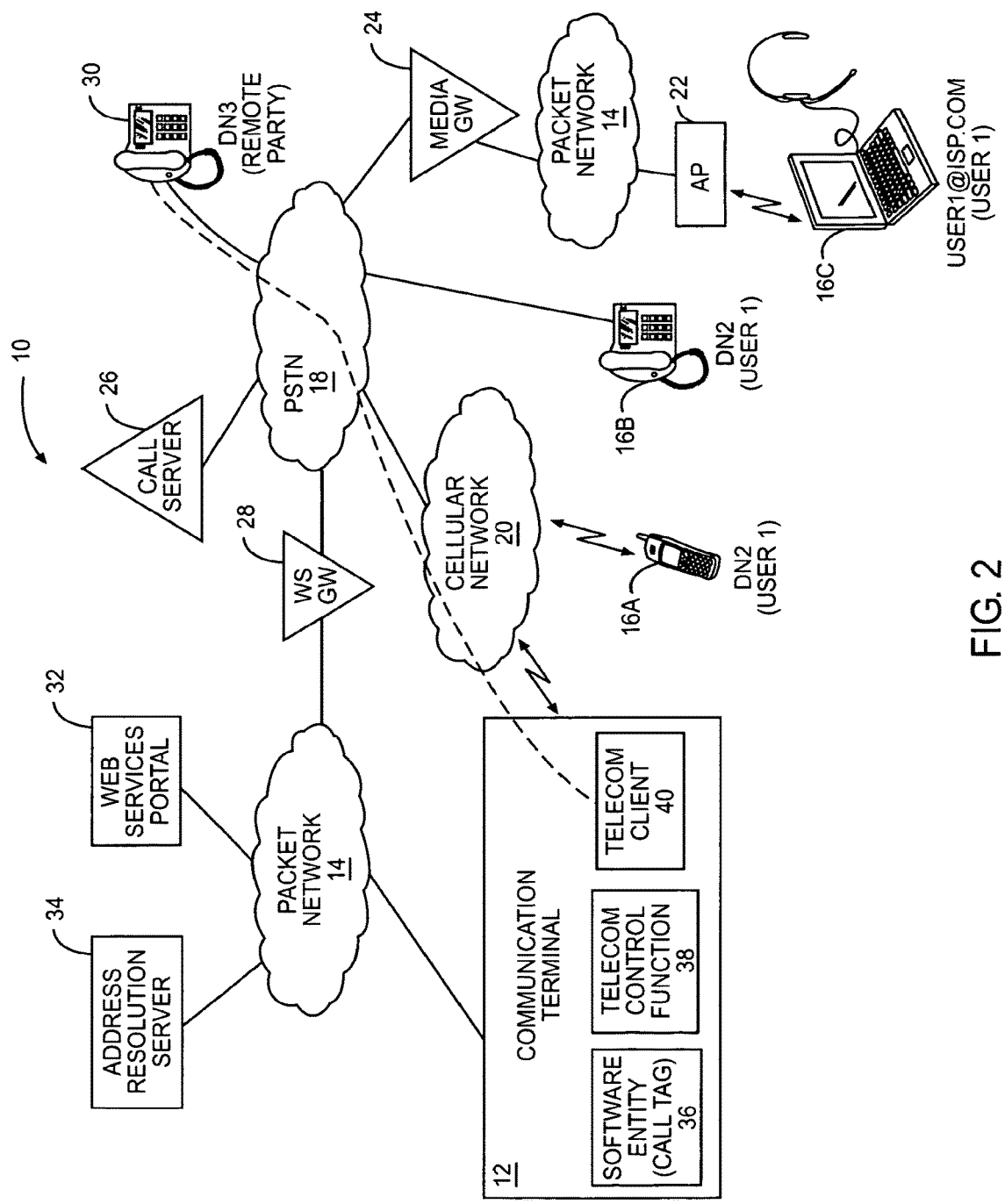
FIG. 2 is a block representation of a communication environment according to a second embodiment of the present invention.

In the embodiment illustrated in FIG. 2, the communication terminal 12 may be equipped with a telecom client 40, which is capable of directly initiating a telephony call via any of the networks illustrated. As depicted, the telecom client 40 has established a telephony call with the remote terminal 30 through the cellular network 20 and the PSTN 18. In operation, the telecom control function 38 will determine when a user selects the call tag of the software entity 36, and will determine when and how to initiate the call based on the call indicia provided from the software entity as well as any user indicia retrieved from the user. When the communication terminal 12 is equipped with a telecom client 40, the telecom control function 38 may determine whether to employ the web services portal 32 to establish a call with the remote terminal 30 from one of the telephony terminals 16A, 16B, or 16C as shown in FIG. 1, or employ the telecom client 40 to directly initiate the telephony call, as illustrated in FIG. 2.

The software entity 36 may be any type of electronic document, such as a web page, instant message, email, word processing document, or spreadsheet. The telecom control function 38 may be co-resident with an application supporting the electronic document, or part of an application having a call tag. The application supporting the electronic document or a supporting operating system may be configured to recognize a request in response to selecting a call tag, and direct the request to the telecom control function 38 for processing. Alternatively, an application may be configured to automatically direct a request or at least the call indicia to the telecom control function 38 in response to a user selecting a call tag.

Figure 3:
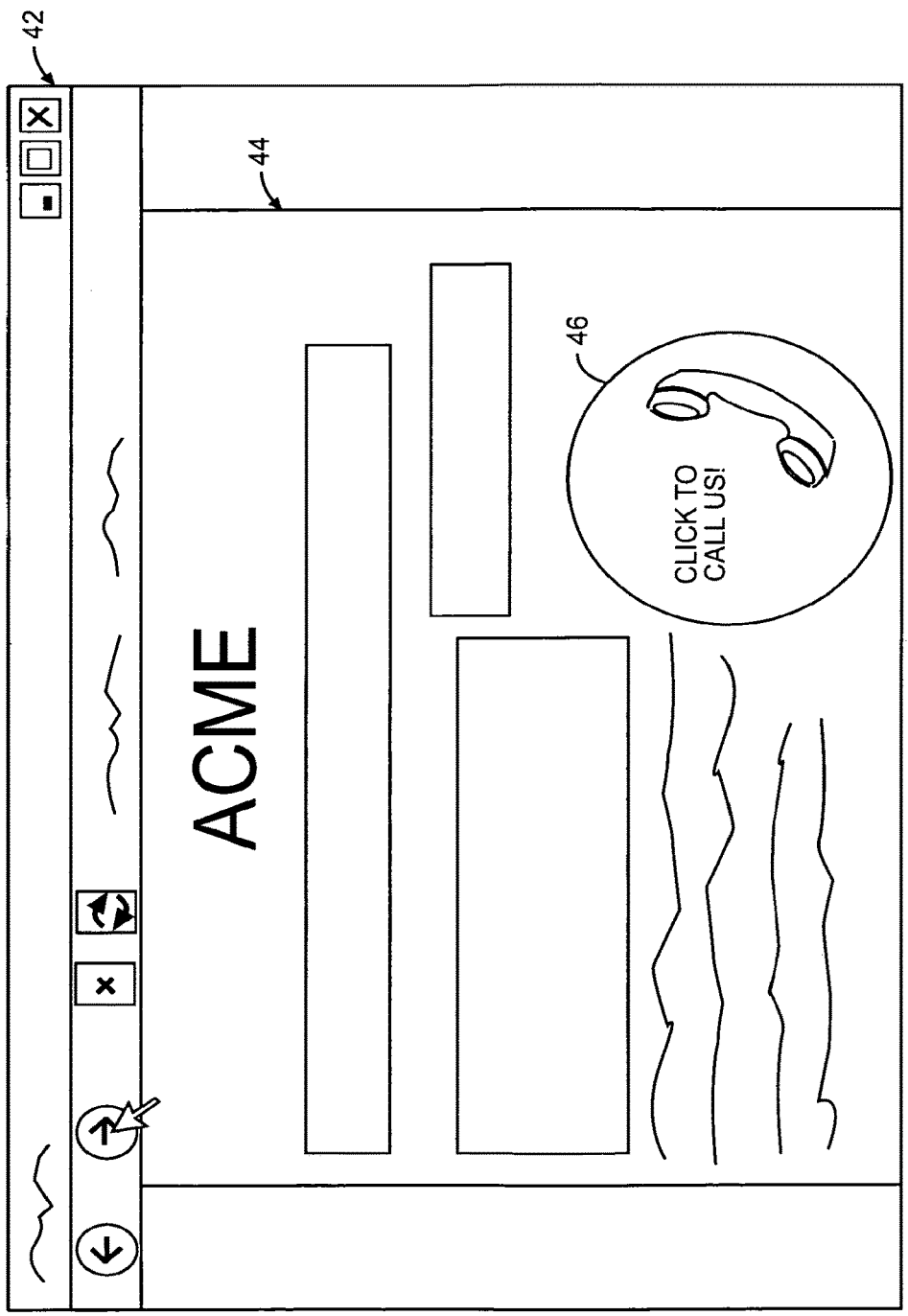
FIG. 3 illustrates a web page including a click-to-call tag displayed on a web browser.

With reference to FIG. 3, a call tag scenario is illustrated according to one embodiment of the present invention. In this example, a web browser interface 42 is capable of receiving and displaying a web page 44 on the communication terminal 12. Embedded in the web page 44 is a click-to-call tag 46. The click-to-call tag 46 is provided in the web page 44 to allow the user to simply click the click-to-call tag 46 and establish a call with the remote terminal 30 using associated call indicia. Since many communication terminals 12 cannot support the call, or the user may desire to use another telephony terminal 16 for the call, selecting the click-to-call tag 46 will result in sending an alert to the telecom control function 38 with the call indicia to use when initiating a call to the remote terminal 30. As indicated, the telecom control function 38 may query the user for user indicia to assist in establishing the call with the remote terminal 30.

Figure 4:
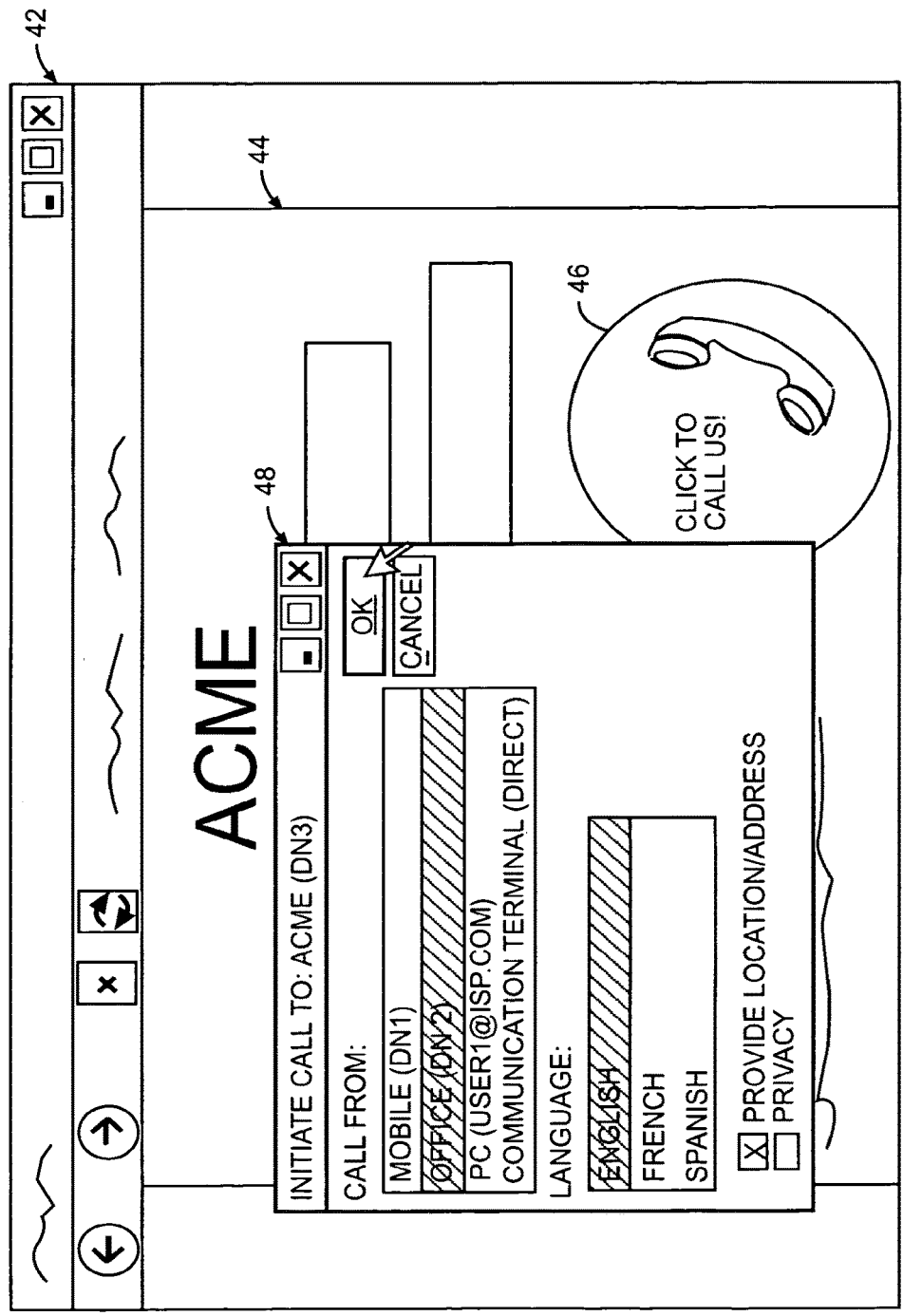
FIG. 4 illustrates a pop-up window provided upon selecting the click-to-call tag provided in the web page illustrated in FIG. 3.

With reference to FIG. 4, the telecom control function 38 may provide a pop-up window 48 in response to determining that the click-to-call button 46 was selected. The pop-up window 48 is configured to allow the user to readily provide any user indicia to assist with initiating the call. The pop-up window 48 may identify the remote terminal 30 by name or by telephony address. In this example, the remote party is ACME and the directory number is DN3. The pop-up window may also allow the user to select a direct or indirect method for establishing the call, and if indirect, the telephony terminal 16A, 16B, or 16C to use for the call. In the illustrated example, the user is provided with a choice to initiate the call from a mobile terminal associated with directory number DN1 (telephony terminal 16A); an office telephone associated with directory number DN2 (telephony terminal 16B); a PC associated with address user1@isp.com (telephony terminal 16C); or the communication terminal 12. Selecting the mobile, office, or PC terminals would result in an indirect establishment of a call from the selected terminal 16 to the remote terminal 30, whereas selection of the communication terminal 12 would result in a direct initiation of a call from the communication terminal 12 using the telecom client 40.

Other user indicia may include various preferences to apply to or associate with any resulting call. For example, the user indicia may identify a preferred language, a privacy request indicating whether call-related information should remain private, whether location or address information should be provided in association with the call to the remote party, billing requests, communication session information, such as available codecs, compression techniques, encryption information, or any other information deemed pertinent for call processing. As such, the user may provide the requisite user indicia by selecting information, entering information, or simply accepting predefined default information. Once the telecom control client 38 receives the user indicia, the call indicia associated with the call tag and any available or pertinent user indicia may be used to determine how to initiate the call.

In addition to call indicia and any available user indicia, other criteria may be used to control initiation of the call. For example, selection between a direct or indirect call initiation may be based on current network connectivity, whether the telecom client 40 is available and active, the type of communication address provided in the call indicia, or the type of software entity 36. For current network connectivity, a direct or indirect method may be chosen based on a quality required or desired for the call. With respect to the telecom client status, call initiation may be direct or indirect depending on whether the telecom client 40 has been installed in the communication terminal 12 and has the requisite software and hardware to facilitate the call, as well as whether or not an existing telecom client 40 is already engaged in a call. The type of communication address may correspond to a directory number or a Session Initiation Protocol (SIP) address, a peer-to-peer address, or a uniform resource locator (URL). A direct or indirect method may be selected based on whether the call indicia corresponds to initiating a call from the user or to the user. The type of software entity 36 may be based on whether the call tag is provided in a web page, email, instant message, or other word processing spreadsheet or document.

Figure 5:
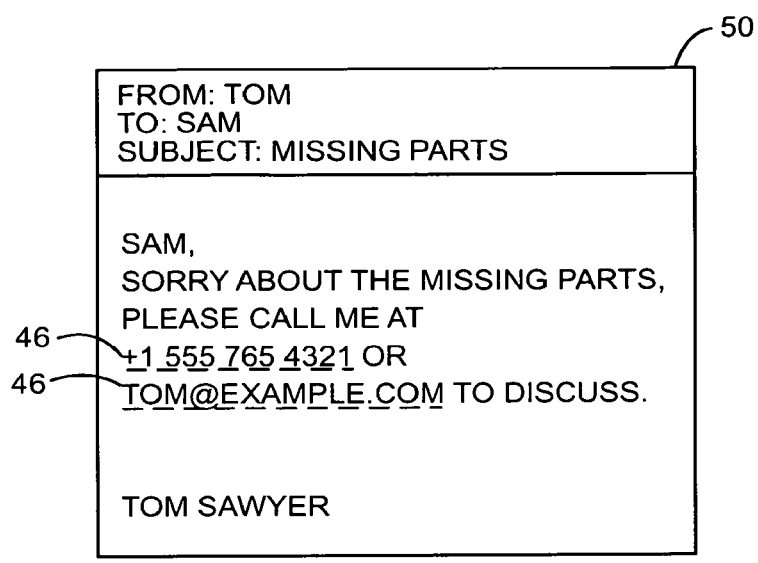
FIG. 5 illustrates an email or instant message including click-to-call tags.

An example of providing click-to-call tags 46 in an email or instant message 50 is illustrated in FIG. 5, wherein selecting "Tom@example.com" or "+1 555 765 4321" results in an alert with associated call indicia being provided to the telecom control function 38 to initiate a call to Tom Sawyer by either the communication terminal 12 or one of the telephony terminals 16.

Figure 6:
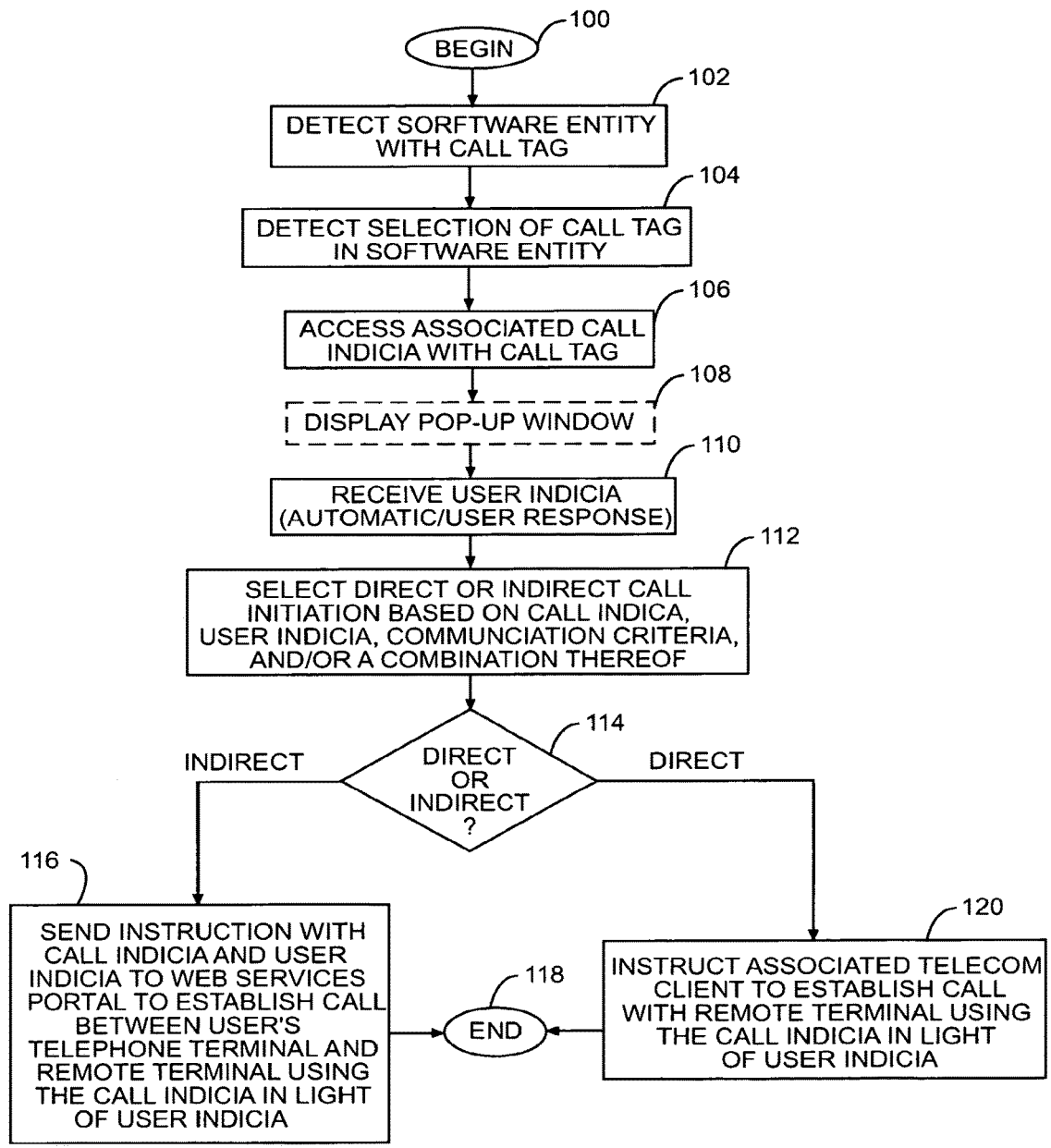
FIG. 6 is a flow diagram illustrating the operation of a telecom control function according to one embodiment of the present invention.

With reference to FIG. 6, a flow diagram is provided to illustrate operation of the telecom control function 38 according to one embodiment of the present invention. The process begins (step 100) wherein the telecom control function 38 will detect the presence or activation of a software entity 36 having a call tag (step 102). The telecom control function 38 will then detect when the call tag associated with the software entity 36 is selected (step 104). The call indicia associated with the call tag is assessed (step 106), and if desired, a pop-up window or like message is provided to the user via the communication terminal 12 (step 108). The pop-up window provides a vehicle for receiving user indicia associated with selecting the call tag. The telecom control function 38 will receive the user indicia in an automatic fashion if predefined rules are provided or through a user response (step 110), and then select direct or indirect call initiation based on the call indicia, the user indicia, and any communication criteria that is pre-established to assist in controlling the operation of the telecom control function 38 (step 112). Notably, selection of the direct or indirect call initiation techniques may be based on any one or a combination of the call indicia, user indicia, and communication criteria.

If an indirect method is chosen (step 114), the telecom control function 38 will send an instruction with any necessary call indicia and user indicia to the web services portal 32 to establish a call between one of the user's telephone terminals 16 and the remote terminal 30 using the call indicia in light of any pertinent user indicia (step 116), and the process ends (step 118). If a direct call initiation method is chosen (step 114), the telecom control function 38 will instruct the associated telecom client 40 to establish the call with the remote terminal 30 using the call indicia in light of any pertinent user indicia (step 120), and the process ends (step 118). For the indirect call initiation method, the communication terminal 12 will not be involved in the call once the call is established. In the direct call initiation method, the communication terminal 12 will originate the call to the remote terminal 30.

Figure 7B:
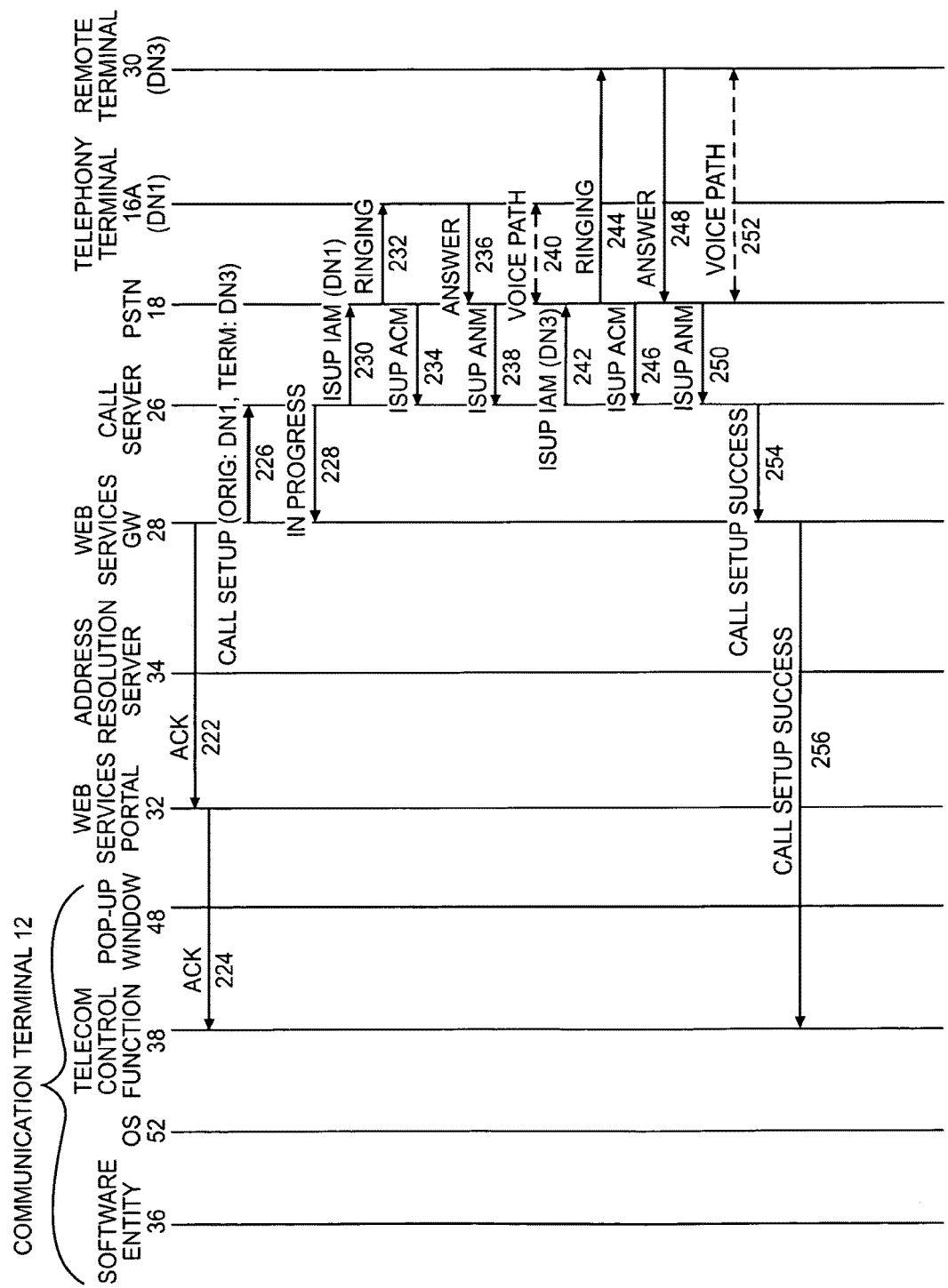

Turning now to FIGS. 7A and 7B, a communication flow is provided for an indirect initiation of a call, which is to be established between telephony terminal 16A and the remote terminal 30. Upon a user selecting a call tag, the software entity 36 will send a Communication Request including call indicia (ADDRESS1) toward a service provider (step 200). The Communication Request is recognized by an operating system (OS) 52, and redirected to the telecom control function 38 (step 202). The telecom control function 38 will provide call initiation information including the call indicia to the user in the form of a pop-up window 48 (step 204). Assuming the user elects to initiate the call from telephony terminal 16A, which is associated with directory number DN1, the telecom control function 38 will receive this information as user indicia retrieved via the pop-up window 48 (step 206). The telecom control function 38 will then use the call indicia, user indicia, communication indicia, or any combination thereof to determine whether to use a direct or indirect method for initiating the call.

Since the user indicia indicated that the call should be initiated from telephony terminal 16A, which is a different than communication terminal 12, the telecom control function 38 will select an indirect method for initiating the call (step 208). Accordingly, the telecom control function 38 will take the requisite steps to initiate the call from telephony terminal 16A to the remote terminal 30. As such, the telecom control function 38 may send an Initiate Call message identifying the originating directory number (DN1), the terminating address (ADDRESS1), and any user preferences pertinent to the call, to the web services portal 32 (step 210). If the web services portal 32 is unable to use ADDRESS1 to establish the call, a Resolve query may be provided to the address resolution server 34 (step 212), which will analyze ADDRESS1 and provide an appropriate address or addresses for the web services portal 32 to use when initiating the call (step 214).

In this example, the address resolution server 34 will have multiple directory numbers corresponding to ADDRESS1. In particular, a first directory number DN3 will initiate a call to a French-speaking remote party, wherein directory number DN4 will initiate a call to an English-speaking remote party associated with a given service. The web services portal 32 will analyze the response from the resolution server 34 in light of the user preferences (step 216). Assuming that the user indicia included user language preferences, the web services portal 32 may select a number to which the call is initiated based on the preferred language. In this case, assume that the user prefers French. As such, the web services portal 32 will direct the call to a French-speaking call center provided by the remote party (step 218). The web services portal 32 will send an Initiate Call message identifying the originating directory number (DN1) and the terminating directory number (DN3) to the web services gateway 28 (step 220), which will send an Acknowledgement message (ACK) back to the web services portal 32 (step 222). The web services portal 32 will forward the Acknowledgement message to the telecom control function 38 (step 224).

In the meantime, the web services gateway 28 will send a Call Setup message identifying the originating directory number (DN1) and the terminating directory number (DN3) to the call server 26 (step 226), which will respond with an In Progress message (step 228). To establish the call between telephony terminal 16A, which is associated with directory number DN1, and the remote terminal 30, which is associated with directory number DN3, the call server 26 will send an Integrated Services User Part (ISUP) Initial Address Message (IAM) to the PSTN 18 (step 230), which will cause the telephony terminal 16A to ring (step 232) and respond to the call server 26 by sending an ISUP Address Complete Message (ACM) (step 234). When telephony terminal 16A is answered by the user, the PSTN 18 will recognize that telephony terminal 16A has been answered (step 236) and send an ISUP Answer Message (ANM) to the call server 26 (step 238), wherein a voice path is established from the PSTN 18 to telephony terminal 16A (step 240). The call server 26 will then attempt to establish a connection to the remote terminal 30 by sending an ISUP IAM message for directory number DN3 to the PSTN 18 (step 242), which will cause the remote terminal to ring (step 244) and respond to the call server 26 with an ISUP ACM (step 246).

When the remote terminal 30 is answered (step 248), the PSTN 18 will send an ISUP ANM to the call server 26 (step 250) and a connection between the PSTN 18 and the remote terminal 30 is established (step 252). The PSTN 18 will take the necessary steps to connect the voice paths extending to telephony terminal 16A and the remote terminal 30 to facilitate the call between telephony terminal 16A and the remote terminal 30. Once the call is established, the call server 26 will send a Call Setup Success message to the web services gateway 28 (step 254), which will forward the Call Setup Success message to the telecom control function 28 (step 256) to indicate that the call has been initiated.

Figure 8:
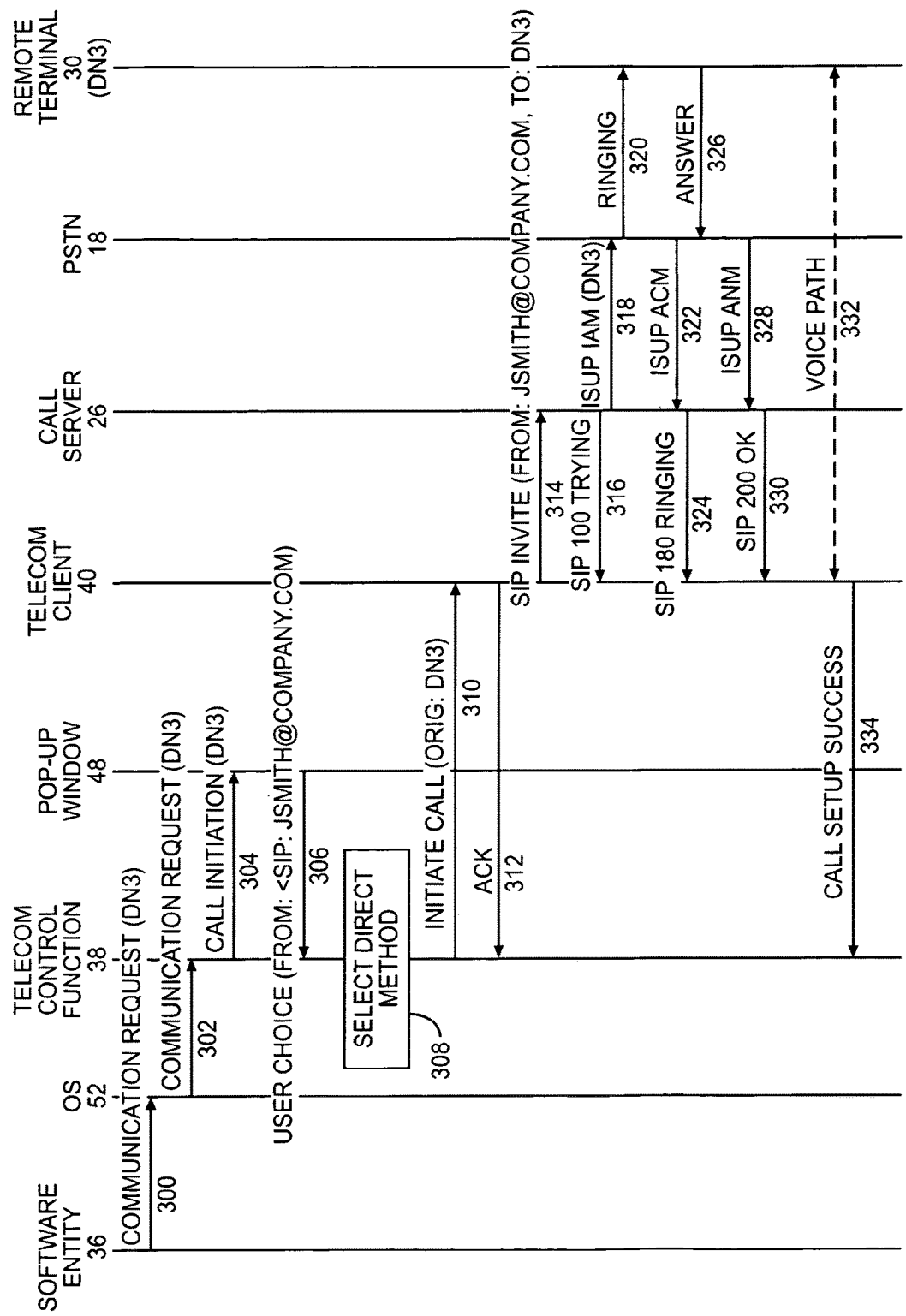
FIG. 8 is a communication flow for a direct call initiation technique according to a second embodiment of the present invention.

With reference to FIG. 8, a communication flow is provided for a direct method of call initiation according to one embodiment of the present invention. Assume that the call indicia is associated with the software entity 36 identifies directory number DN3 as the destination for a call when an associated call tag is selected. Upon selecting the call tag, the software entity 36 will send a Communication Request, which is redirected by the operating system 52 to the telecom control function 38 (steps 300 and 302). The Communication Request will include the call indicia, including directory number DN3. The telecom control function 38 will provide a pop-up window 48 indicating that the call tag has been selected and that a call to directory number DN3 will ensue (step 304). The user may provide a selection indicating that a direct method of call initiation should take place. In this example, assume the SIP URL jsmith@company.com is associated with the communication terminal 12. Accordingly, the pop-up window 48 will provide the telecom control function 38 with the user's choice (step 306), and the telecom control function 38 will select a direct method for initiating the call (step 308).

To initiate the call, the telecom control function 38 will send an Initiate Call instruction to the telecom client 40 (step 310). The Initiate Call instruction will identify the directory number DN3 as the desired destination for the call. The telecom client 40 will acknowledge receipt of the Initiate Call instruction (step 312), and send an appropriate initiation message to the call server 26 to initiate the call to the remote terminal 30, which is associated with directory number DN3. In this example, SIP is used to facilitate communications between the telecom client 40 and the call server 26. As such, a SIP Invite message is sent from the telecom client 40 to the call server 26 indicating that a session should be established from jsmith@company.com to directory number DN3 (step 314). The call server 26 will respond in traditional SIP fashion by sending a SIP 100 Trying message back to the telecom client 40 (step 316). The call server 26 will then send an ISUP IAM identifying directory number DN3 to the PSTN 18 (step 318), which will cause the remote terminal 30 to begin ringing (step 320). The PSTN 18 will respond with an ISUP ACM (step 322), wherein the call server 26 will send a SIP 180 Ringing message to the telecom client 40 (step 324).

When the remote terminal 30 is answered, the PSTN 18 will receive an Answer indication (step 326) and send an ISUP ANM to the call server 26 (step 328), which will send a SIP 200 OK message to the telecom client 40 (step 330). At this point, a communication session for the call is established between the telecom client 40 and the remote terminal 30 to facilitate a voice path (step 332). The telecom client 40 may send a Call Setup Success message to the telecom control function 38 to indicate that the call has been established (step 334).

From the above, the present invention allows a telecom control function 38 located on a communication client 12 to effectively establish a call between other telephony terminals 16 and a remote terminal 30. Establishment of the call may be controlled in part based on user indicia dynamically obtained upon the telecom control function 38 detecting that a call tag has been selected. Instead of relying on the application supporting the call tag or the document including the call tag to directly initiate the call, the telecom control function 38 may be invoked to cooperate with the web services portal 32 to have the call established in an indirect fashion. When the communication terminal 12 is equipped with a telecom client 40, the telecom control function 38 may decide whether to use a direct or indirect method to initiate the call, wherein direct call initiation will involve having the telecom control function 38 instruct the telecom client 40 to directly initiate a call to the remote terminal 30. The dynamically recovered user indicia may be used by the telecom control function 38 to determine how to initiate the call, as well as by the web services portal 32 to control how the call is actually initiated. The user indicia may include preferences bearing on how the call is established or where the call is established.

Figure 9:
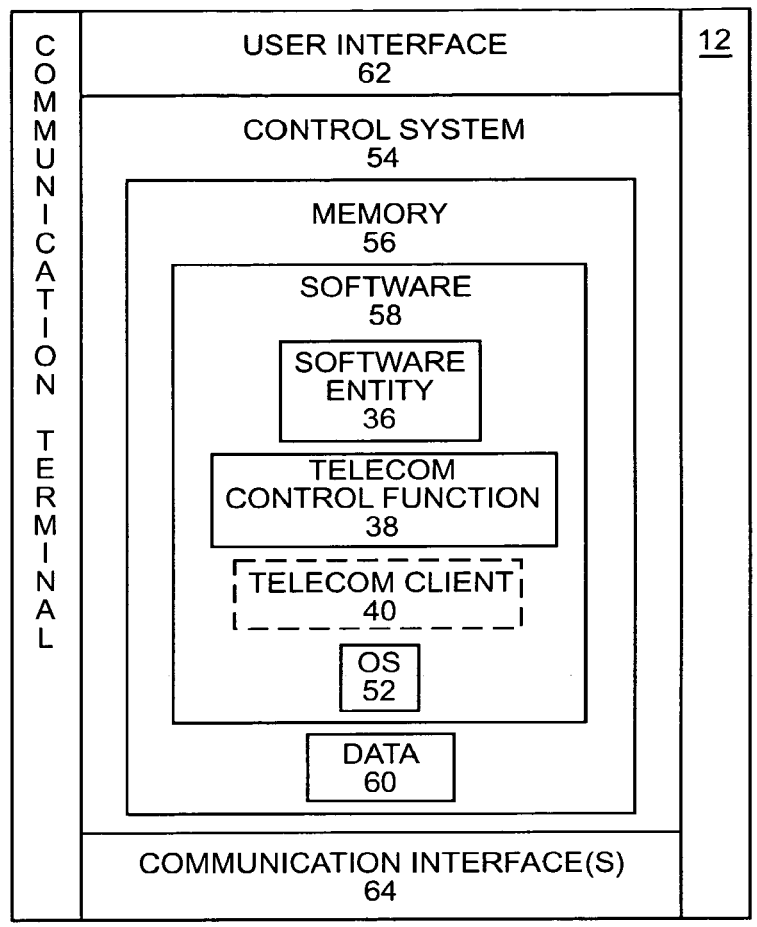
FIG. 9 is a block representation of a communication terminal according to one embodiment of the present invention.

With reference to FIG. 9, an exemplary communication terminal 12 is illustrated. The communication terminal 12 may include a control system 54 with sufficient memory 56 for the requisite software 58 and data 60 to operate as described above. The software 58 may support various applications supporting various electronic documents, wherein certain of the applications or electronic documents may represent the software entity 36. The software 58 may also support all or a portion of the telecom control function 38, and if so equipped, the telecom client 40. The various applications may run on an appropriate operating system 52, which may be configured to support all or a part of the telecom control function 38 as well as assist in redirecting responses triggered by a user selecting a call tag to the telecom control function 38 for processing. The control system 54 may also be associated with an appropriate user interface 62 as well as any number of communication interfaces 64, to facilitate communications with any variety of networks, including the packet network 14 and the PSTN 18, directly or indirectly via the packet network 14 and the cellular network 20. The communication interfaces 64 may support all or part of the telecom client 40 as well as the telecom control function 38.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
at a first electronic device with a display apparatus and one or more input devices:
displaying, via the display apparatus, a user interface that includes information about a respective type of operation, wherein the user interface includes controls that provide an option to initiate a first operation of the respective type of operation;
while displaying, via the display apparatus, the user interface that includes information about the respective type of operation, receiving, via the one or more input devices, a first request to display information about other devices that are available to handle the respective type of operation;
in response to receiving the first request, displaying, via the display apparatus, information identifying a second electronic device that is available to handle the respective type of operation, wherein the information identifying the second electronic device is displayed concurrently with at least a portion of the user interface that includes information about the respective type of operation;
while displaying the information identifying the second electronic device concurrently with the portion of the user interface that includes information about the respective type of operation, receiving, via the one or more input devices, a second request to transfer the first operation initiated by the first electronic device to the second electronic device, wherein the first operation is the respective type of operation; and in response to receiving the second request to transfer the first operation, transferring the first operation to the second electronic device, wherein the first operation is initiated by the first electronic device before it is transferred to the second electronic device.

2. The method of claim 1, wherein the first operation comprises a communication session.

3. The method of claim 1, wherein the first operation comprises a phone call.

4. The method of claim 1, wherein the information identifying the second device identifies a plurality of device that are available to handle the respective type of operation.

5. The method of claim 1, wherein the second electronic device comprises a mobile phone.

6. The method of claim 1, wherein the first electronic device comprises a personal computer.

7. The method of claim 1, wherein the first device comprises a handheld device.

8. The method of claim 1, further comprising:

initiating the first operation;

wherein the information about the respective type of operation comprises information about the first operation, wherein the information identifying the second device to handle the respective type of operation comprises information identifying the second device to handle the first operation.

9. A first device, comprising:

a display;

one or more inputs; and one or more processors coupled to the display and the one or more inputs, wherein the one or more processors are configured to:

display, via the display, a user interface that includes information about a first operation of a first type;

initiate the first operation;

while displaying, via the display, the user interface that includes information about the first operation, receive, via the one or more inputs, a first request to display information identifying one or more devices that are available to handle operations of the first type;

in response to receiving the first request, display, via the display, the information identifying the one or more devices that are available to handle operations of the first type, wherein the information identifies a second device, and wherein the information identifying the one or more devices is displayed concurrently with at least a portion of the user interface that includes information about the first operation;

while displaying the information identifying the one or more devices concurrently with the portion of the user interface that includes information about the first operation, receive, via the one or more inputs, a second request to transfer the first operation initiated by the first device to the second device; and in response to receiving the second request to transfer the first operation, transfer the first operation to the second device.

10. The first device of claim 9, wherein the first operation comprises a communication session.

11. The first device of claim 9, wherein the first operation comprises a phone call.

12. The first device of claim 9, wherein the information identifying the one or more devices identifies a plurality of device that are available to handle operations of the first type.

13. The first device of claim 9, wherein the second device comprises a mobile phone.

14. The first device of claim 9, wherein the first device comprises a personal computer.

15. The first device of claim 9, wherein the first device comprises a personal digital device.

16. A non-transitory computer accessible memory medium storing program instructions executable by a processor of a first device to:

display, via a display coupled to the first device, a user interface that includes information about a first operation;

initiate the first operation;

while displaying, via the display, the user interface that includes information about the first operation, receive, via one or more input devices of the first device, a first request regarding devices that are available to handle the first operation;

in response to receiving the first request, display information identifying a second device that is available to handle the first operation, and wherein the information identifying the second device is displayed concurrently with at least a portion of the user interface that includes information about the first operation;

while displaying the information identifying the second device concurrently with the portion of the user interface that includes information about the first operation, receive, via the one or more input devices of the first device, a second request to transfer the first operation initiated by the first device to the second device; and in response to receiving the second request to transfer the first operation, transfer the first operation to the second device.

17. The non-transitory computer accessible memory medium of claim 16, wherein the first operation comprises a phone call.

18. The non-transitory computer accessible memory medium of claim 16, wherein the information identifying the second device identifies a plurality of device that are available to handle the first operation.

19. The non-transitory computer accessible memory medium of claim 16, wherein the second device comprises a mobile phone.

20. The non-transitory computer accessible memory medium of claim 16, wherein the first device comprises a personal computer.

* * * * *